United States Patent [11] 3,632,362

[72] Inventors Nobuo Urushiyama;
 Hiromichi Koshiishi; Kaneo Akanuma, all of Kitakyushu, Japan
[21] Appl. No. 845,601
[22] Filed June 27, 1969
[45] Patented Jan. 4, 1972
[73] Assignee Nippon Steel Corporation
 Tokyo, Japan
[32] Priority Mar. 18, 1966
[33] Japan
[31] 41/16903
 Continuation of application Ser. No. 624,072, July 9, 1963, now abandoned. This application June 27, 1969, Ser. No. 845,601

[54] INSULATION COATING FOR ELECTRICAL STEEL SHEET AND METHOD OF APPLICATION
 6 Claims, No Drawings
[52] U.S. Cl. .................................................. 106/123LC, 117/230, 252/63, 252/63.7, 260/29.6 BM, 260/29.6 MP
[51] Int. Cl. ............................................................ C08h 15/02, H01f 5/06
[50] Field of Search............................................ 106/123; 260/29.6 BM, 29.6 E, 29.6 MP; 117/230, 234; 252/63, 63.7

[56] References Cited
UNITED STATES PATENTS

| | | | |
|---|---|---|---|
| 2,938,813 | 5/1960 | Matsuda | 117/230 |
| 3,210,219 | 10/1965 | Jenkins | 117/230 |
| 3,297,493 | 1/1967 | Blum et al. | 117/230 |
| 3,318,731 | 5/1967 | Blum | 117/230 |
| 3,522,108 | 7/1970 | Yamamoto et al. | 117/230 |
| 1,860,043 | 5/1932 | Ludwigsen | 106/123 |
| 2,579,482 | 12/1951 | Fenn | 106/123 |
| 2,622,992 | 12/1952 | Bergve | 106/123 |
| 3,126,291 | 3/1964 | King | 106/123 |
| 3,147,129 | 9/1964 | Armstrong, Jr. et al. | 106/123 |
| 2,935,504 | 5/1960 | King et al. | 252/8.5 |
| 3,112,206 | 11/1963 | Mocsny | 106/123 |
| 3,293,054 | 12/1966 | Lennox et al. | 106/123 |
| 3,314,807 | 4/1967 | Blackmore | 106/123 |

*Primary Examiner*—Donald J. Arnold
*Assistant Examiner*—John H. Miller
*Attorney*—Wenderoth, Lind & Ponack ABSTRACT: An aqueous composition producing an insulation coating having excellent adhesion to electrical steel sheet consists of 5–50 percent of a lignin sulfonate, 0.5–15 percent of a water soluble phosphate, 0–15 percent of a water soluble chromate or borate and up to 50 percent of a high molecular weight water soluble organic compound such as polyvinyl alcohol, polyethyleneglycol, etc.

The aqueous solution or dispersion is coated onto the steel sheet after which it is heated to 200°–500° C. in 1 to 120 seconds to cure the coating.

INSULATION COATING FOR ELECTRICAL STEEL SHEET AND METHOD OF APPLICATION

This application is a continuation of application Ser. No. 624,072 filed on July 9, 1963 and now abandoned.

This invention relates to a composition for coating a surface of an electrical steel sheet with an organic film.

An iron core used in a transformer, generator, motor, etc. must have a high electrical insulation resistance (interlayer resistance) on the surface thereof in order to prevent generation of eddy currents, and, further, an electrical sheet having a good punching property is required for assembling the iron core.

The punching property of an electrical sheet is influenced by a number of factors, one of which is the lubricating property of the surface coating thereof. It is well known that the lubricating property of an electrical sheet is improved by coating the surface of the sheet with an organic coating. Up to this time, an organic electrical insulation coating has been generally prepared by drying naturally or by heating at a low temperature an organic resin containing an organic solvent, since such coating solution is inflammable. Therefore, the drying process takes many hours, which necessitates employing a drying plant designed with care.

The coating composition of the invention, having excellent heat resistance properties, makes possible baking at a high temperature in a short time, heretofore not experienced in the varnish-type coating treatment of the art.

In addition, the coating composition of the invention is in no way inferior to the varnish-type coating composition as concerns other properties required for a coating composition for electrical sheets, as for example, electrical insulation property, punching property and oil resistance.

Moreover, it is particularly to be noted that the main component of the composition of the present invention can be obtained from pulp waste liquor. Consequently, the composition of the present invention can be obtained at a very low cost, as for instance, in the case of an aqueous solution of calcium lignin sulfonate, at such a low cost as about one-tenth of that of a commercial oil varnish of type C-3, and even in the case of the coating composition of example 5, about one-fifth of the latter. Thus, the composition of the present invention has a high industrial value, since excellent properties of the coating produced by the composition is coupled with this economic advantage.

The composition for forming an organic coating of the present invention is applied to electrical sheets made of silicon steel or common steel. The composition consists of an aqueous solution or suspension, which contains lignin derivatives exclusively, or as the main component with certain inorganic and organic compounds added thereto.

Lignin contained in the waste liquor as a byproduct of pulp making is a material of complicated structure, but is considered to be basically composed of:

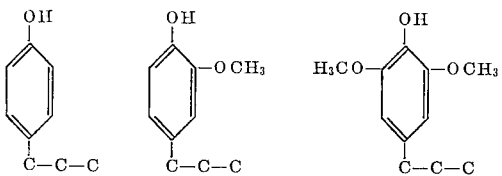

Such lignin or lignin derivatives are converted into water-soluble and water-dispersible compounds by reaction with sulfurous acid, nitric acid, hydrochloric acid and the like, said water-soluble and water-dispersible compound being employed in the present invention as the basic compounds for forming an electrical insulation coating.

In addition, suitable lignin sulfonates used in this invention include salts of ammonium, alkali metals, alkaline earth metals and elements in Group IB and IIB of the Periodic Table.

The coating may be formed from an aqueous solution or suspension containing only a water-soluble or water-dispersible compound, obtained by a decomposition or a combination of lignin, in a proportion of from 1 to 90 percent by weight of the aqueous solution or suspension. In a preferred aspect of the invention, the proportion of the water-soluble or water-dispersible compound is from 5 to 50 percent by weight of the aqueous solution or suspension. It is also desirable that the aqueous solution or suspension additionally contains one or more compounds selected from the group consisting of phosphoric acid including (water-soluble P-compound as, for example, the monosalt, disalt and trisalt of $H_3PO_4$, pyrophosphoric acid, phosphorous acid, hypophosphorous acid and polyphosphoric acid), chromic acid including (water-soluble Cr-compound as, for example, $CrO_3$, chromate, bichromates and chromium phosphate) and boric acid including (water-soluble B-compounds as, for example, borates) in an amount of from 0.1 to 30 percent by weight of the aqueous solution or dispension. The aqueous solution or dispension should be regulated so that the organic matter may be present in the painted coating in the proportion of more than 30 percent by weight, and preferably more than 50 percent by weight.

The inorganic compound of Cr and B serve to raise the water and humidity resisting properties of the coating. Addition of phosphoric acid markedly improves the water resistance, heat resistance and adhesion of the coating. In particular, the P-compounds are excellent for use as stabilizing liquids and are capable of improving the appearance and water resistance of the coating when used within a range of 0.5-15 percent by weight of the aqueous solution or dispersion. If the content of the water-soluble or water-dispersible compound obtained by the decomposition or combination of lignin is below the foregoing range, i.e. 1-90 percent, the electrical insulation resistance and punching property become insufficient, while if above the range, it becomes difficult to obtain a uniform thin film. If the addition of one or more of the water-soluble P-, Cr-, and B-compounds is below the foregoing range, i.e. 0.1-30 percent, its effect becomes insufficient, while if above the range, the adhesion of the coating becomes worse.

An aqueous solution or suspension of the water-soluble or water-dispersible compound obtained by the decomposition or combination of lignin may be made acidic by addition of an organic or inorganic acid (including dicarboxylic acid) such as $CH_3COOH$, $HCl$, $HNO_3$, $HNO_2$, $H_2SO_4$, $HClO$ and $HClO_4$, or may be made alkaline by addition of an ammonia or a compound of alkali metal or alkaline earth metal, or may be made neutral by addition of one of their salts. A water-soluble organic solvent such as aqueous solution or suspension. In particular, the P-compounds are excellent for use as stabilizing liquids and are capable of improving the appearance and water resistance of the coating when used within a range of 0.5-15 percent by weight of the aqueous solution or dispersion.

If a water-soluble organic compound such as ethylene glycol, polyethylene glycol, glycerine, polyvinyl alcohol, methyl ethyl cellulose, starch, polyacrylic acid and amino resin is added to the aqueous solution or dispersion, the adhesion of the coating is improved. In particular, a water soluble high molecular compound such as polyvinyl alcohol, methyl ethyl cellulose, starch, polyacrylic acid, polyethylene glycol and amino resin improves the adhesion of the coating, and also improves the appearance and thick coating property, and acts as a viscosity modifier of the coating solution, resulting in a uniform coating even when applied by the roller coating process. The amount of such compound to be added is preferably from 1-10 parts to 10 parts of the weight of the lignin compound. If more than 10 parts are added, the economical advantage of the coating is lost.

In order to raise the electrical resistance and heat resistance, magnesium oxide, titanium oxide, vanadium oxide, molybdenum oxide, manganese oxide, iron oxide, nickel oxide, copper oxide, zinc oxide, aluminum oxide, lead oxide, antimony oxide, silica, mica, talc, bentonite and the like may be used.

The coating solution is ordinarily applied to an electrical sheet in a proportion of from 0.5 to 10 g./m.$^2$, preferably from 1 to 7 g./m.$^2$ calculated in an amount of film after drying (baked), and then the painted sheet is subjected to heating and baking at a surface temperature of from 200° to 500° C., preferably from 250° to 450° C., for a period of from 1 to 120 seconds, preferably from 5 to 60 seconds. Further, a surface active agent, in particular, nonionic surface active agents, such as polyethylene glycol and lauryl ether, may be added to raise the wetting property of the coating solution. The amount thereof is preferably 0.01 to 5 percent by weight of the coating solution.

A means for painting the coating composition of the present invention is not restricted, but the roller coating or spray coating is preferred.

The following examples are given in order to illustrate the invention.

EXAMPLE 1

| | |
|---|---|
| Calcium lignin sulfonate | 50 g. |
| H$_2$O | 100 g. |

EXAMPLE 2

| | |
|---|---|
| Calcium lignin sulfonate | 50 g. |
| H$_3$PO$_4$ | 20 g. |
| H$_2$O | 100 g. |

EXAMPLE 3

| | |
|---|---|
| Lignin sulfonic acid | 50 g. |
| H$_3$PO$_4$ | 15 g. |
| CrO$_3$ | 2 g. |
| H$_2$O | 100 g. |

EXAMPLE 4

| | |
|---|---|
| Ammonium lignin sulfonate | 50 g. |
| Zn(H$_2$PO$_4$)$_2$ | 20 g. |
| Polyvinyl alcohol | 20 g. |
| H$_2$O | 200 g. |

Each of the foregoing compositions was painted thinly and uniformly on an electrical sheet in a proportion of from 2 to 6 g./m.$^2$ calculated in an amount of film after drying and the painted sheet was heated at a temperature of 280° C. for 30 seconds. The amount of adhesion, interlayer resistance and adhesiveness of the films coated on the sheet were as shown in table 1. The resultant films showed heat resistance at a temperature of 200° C., oil resistance against substances such as to xylene, and good punching properties. Further, they have lubricating properties during the punching process, and may also be painted to form an electrical insulation coating after the sheet was punched or cut.

TABLE 1

| Item | Example 1 | Example 2 | Example 3 | Example 4 |
|---|---|---|---|---|
| Amount of adhesion (after drying) g./m.$^2$ | 2 | 4 | 5 | 6 |
| Interlayer resistance Ωcm.$^2$/sheet (ASTM Second process) 35 hg./cm.$^2$ | 20 | 123 | X | X |
| Adhesiveness | XX | XX | XX | XX |

Note: X: Measurement was impossible due to a high interlayer resistance.

XX: No stripping occurred when bent into 10m. diameter.

EXAMPLE 5

| | |
|---|---|
| Calcium lignin sulfonate | 50 g. |
| H$_3$PO$_4$ | 9 g. |
| Polyvinyl alcohol (n=1,700) | 30 g. |
| Polyethylene glycol lauryl ether (nonionic surfactant) | 1 g. |
| H$_2$O | 200 g. |

The foregoing solution was painted thinly and uniformly on an electrical sheet in a proportion of 4 g./m.$^2$ calculated in an amount of film after drying and the painted sheet was heated at a temperature of 400° C. for 5 seconds. The resultant sheet was dipped in xylene and electric insulation oil (corresponding to JIS C 2320 No. 2) to investigate xylene resistance and electric insulation oil resistance of the coated film. The same test was conducted on C-3 oil type varnish. The results of the investigations are shown in tables 2 and 3. Further, table 4 shows the results of a comparative test of heat resistance of a commercial C-3 oil type varnish and the organic coating composition (the amount of adhesion to the sheet was 4 g./m.$^2$) of this example.

TABLE 2.—XYLENE RESISTANCE OF THE COATING COMPOSITION

| | Interlayer resistance | | | |
|---|---|---|---|---|
| | Before oil dipping Ω cm.$^2$/sheet (35 kg./cm.$^2$) | After 6 hours of oil dipping at 90° C. Ω cm.$^2$/sheet (35 kg./cm.$^2$) | Change in weight, increase, percent | Appearance, after 6 hours at 90° C. |
| Example 5 | 209 | 316 | 2.2 | No change |
| C-3 oil type varnish | 85.7 | 155 | | |

TABLE 3.—ELECTRICAL INSULATION OIL[1] RESISTANCE OF THE COATING COMPOSITION

| | Interlayer resistance | | Change in weight, after 90 hours at 110° C, percent | Appearance, after 90 hours at 110° C. | Puncture voltage of oil | | Oxidation of oil | |
|---|---|---|---|---|---|---|---|---|
| | Before oil dipping Ωcm.$^2$/sheet (35 kg./cm.$^2$) | After 90 hours of oil dipping at 110° C., Ωcm.$^2$/sheet (35 kg./cm.$^2$) | | | Before oil dipping, kv. | After 90 hours at 110° C., kv. | Before baking | After 90 hours of baking at 110° C. |
| Example 5 | 123 | 316 | 2.2 | No change | 50 | 50 | 0.02 | 0.02 |
| Commercial varnish | 52.2 | 155 | | | | | | |

[1] Oil corresponds to JIS C 2320 No. 2.

TABLE 4.—HEAT RESISTANCE COMPARISON OF THE COATING COMPOSITION OF EXAMPLE 5 AND COMMERCIAL C-3 OIL TYPE VARNISH

| | After 48 hours at 150° C., decrease percent | After 48 hours at 200° C., decrease percent | After 48 hours at 250° C., decrease percent | After 30 days at 150° C., decrease percent | After 30 days at 200° C., decrease percent |
|---|---|---|---|---|---|
| Coating composition of Example 5 | 1.1 | 4.4 | 13.1 | 4.4 | 20.7 |
| Commercial varnish: | | | | | |
| A | 3.5 | 23.1 | 49.5 | 20.8 | 48.4 |
| B | 1.7 | 11.7 | 26.6 | 13.3 | 33.3 |
| C | 9.6 | 45.7 | 54.0 | 42.1 | 63.7 |
| D | 1.0 | 12.3 | 27.6 | 18.3 | 27.3 |
| E | 11.8 | 13.6 | 45.3 | 31.3 | 52.2 |
| F | 3.6 | 10.7 | 25.1 | 17.4 | 22.9 |

The punching property of the electrical sheet obtained by heating and baking the coating composition of example 5 was five to eight times as much as that having no coating, and was twice as much as that of a sheet coated with the commercial C-3 oil-type varnish.

What is claimed is:

1. A coating composition for forming an organic coating on an electrical sheet consisting essentially of an aqueous solution or dispersion of a lignin sulfonate selected from the group consisting of lignin sulfonates of ammonium, an alkali metal, an alkaline earth metal and elements in Group IB and Group IIB of the Periodic Table, said lignin sulfonate being present in an amount of 5 to 50 percent based upon the weight of the aqueous solution or dispersion and a phosphorous compound selected from the group consisting of phosphoric acid, water-soluble salts of phosphoric acid, pyrophosphoric acid, hypophosphorous acid, and polyphosphoric acid, said phosphorous compound being present in an amount of 0.5-15 percent by weight of the aqueous solution or dispersion 0.0-15 percent of at least one compound selected from the group consisting of a water-soluble chromium compound and a water-soluble boron compound selected from the group consisting of $CrO_3$, chromates, bichromates and chromium phosphate, boric acid and borates, and a high molecular weight water-soluble organic compound selected from the group consisting of polyethyleneglycol, starch, polyacrylic acid, methyl ethyl cellulose, and polyvinyl alcohol added in a proportion of 1 to 10 parts by weight to 10 parts by weight of the lignin sulfonate.

2. A composition according to claim 1 wherein the lignin sulfonate is calcium lignin sulfonate; the phosphorous compound is phosphoric acid; the water-soluble organic compound is starch and the chromium compound is chromic acid.

3. A process for forming an electrical insulating coating on an electrical steel sheet comprising applying uniformly an aqueous treating solution or dispersion consisting essentially of a lignin sulfonate selected from the group consisting of lignin sulfonates of ammonium, an alkali metal, an alkaline earth metal and elements in Group IB and Group IIB of the Periodic Table, said lignin sulfonate being present in an amount of 5 to 50 percent based upon the weight of the aqueous solution or dispersion, a phosphorous compound selected from the group consisting of phosphoric acid, water-soluble salts of phosphoric acid, pyrophosphoric acid, hypophosphorous acid and polyphosphoric acid, said phosphorous compound being present in an amount of 0.5-15 percent by weight of the aqueous solution or dispersion, 0-15 percent of at least one water-soluble chromium compound or water-soluble boron compound selected from the group consisting of $CrO_3$, chromates, bichromates and chromium phosphate, boric acid and borates and a high molecular weight water-soluble organic compound selected from the group consisting of polyethyleneglycol, starch, polyacrylic acid, methyl ethyl cellulose, and polyvinyl alcohol in a proportion of 1 to 10 parts by weight to 10 parts by weight of the lignin sulfonate to the surface of the electrical steel sheet in a proportion of 0.5 to 10 g./m.$^2$ as calculated on the dried amount of the coating and heating the steel sheet up to 200° to 500° C. in 1 to 120 seconds.

4. A process according to claim 3 wherein the water-soluble organic compound used in the treating solution is starch.

5. A process in accordance with claim 3 wherein the high molecular weight, water-soluble organic compound is polyvinyl alcohol.

6. A process in accordance with claim 3 wherein the high molecular weight, water soluble organic compound is methyl ethyl cellulose.

* * * * *